July 4, 1961 W. WINZENBURG 2,990,765
STEREO-CAMERA FOR SCIENTIFIC AND SURGICAL PHOTOGRAPHY
Filed Nov. 25, 1957 3 Sheets-Sheet 1

INVENTOR
WILHELM WINZENBURG
BY
Nolte and Nolte
ATTORNEYS

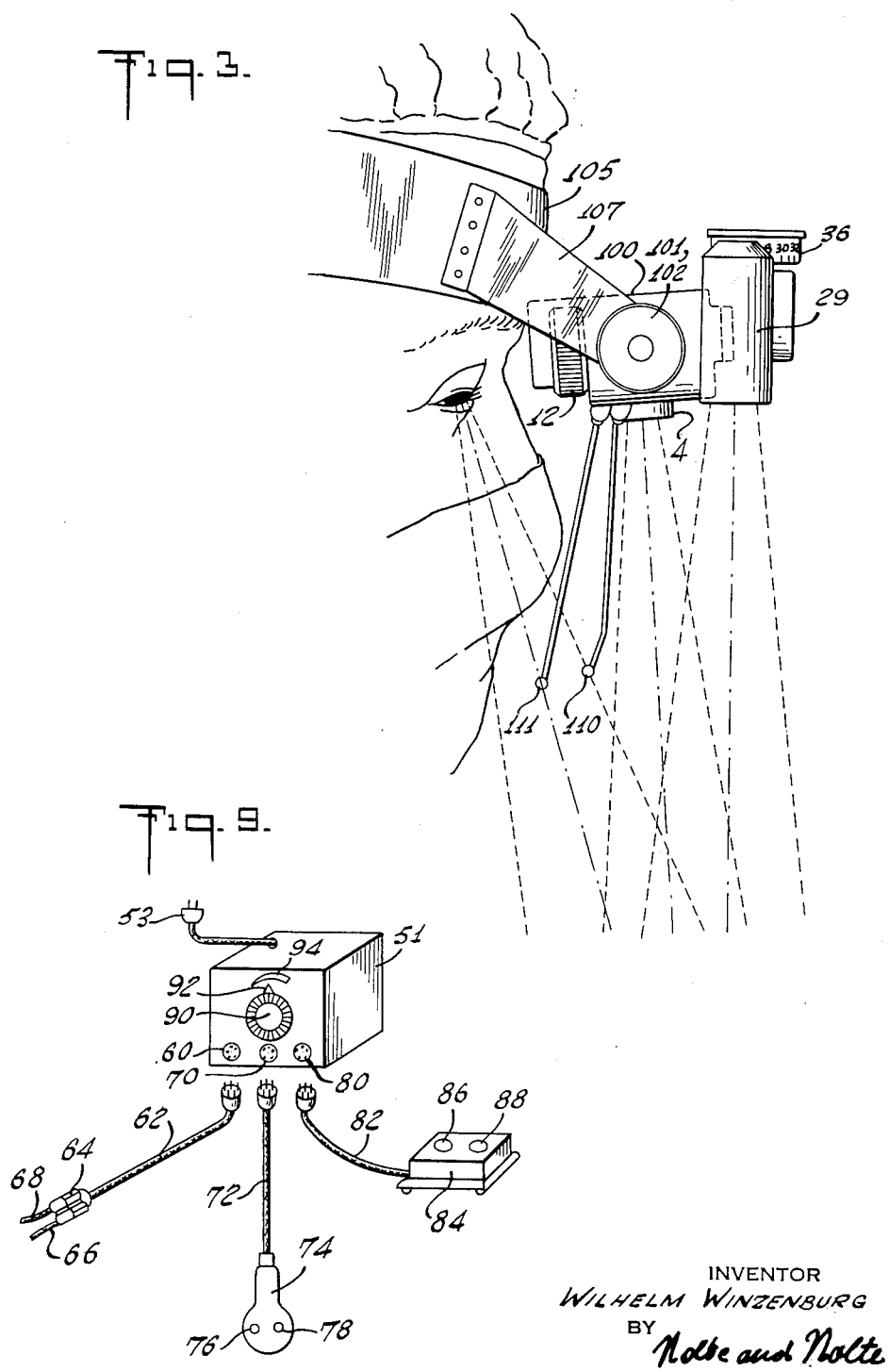

July 4, 1961  W. WINZENBURG  2,990,765
STEREO-CAMERA FOR SCIENTIFIC AND SURGICAL PHOTOGRAPHY
Filed Nov. 25, 1957  3 Sheets-Sheet 3
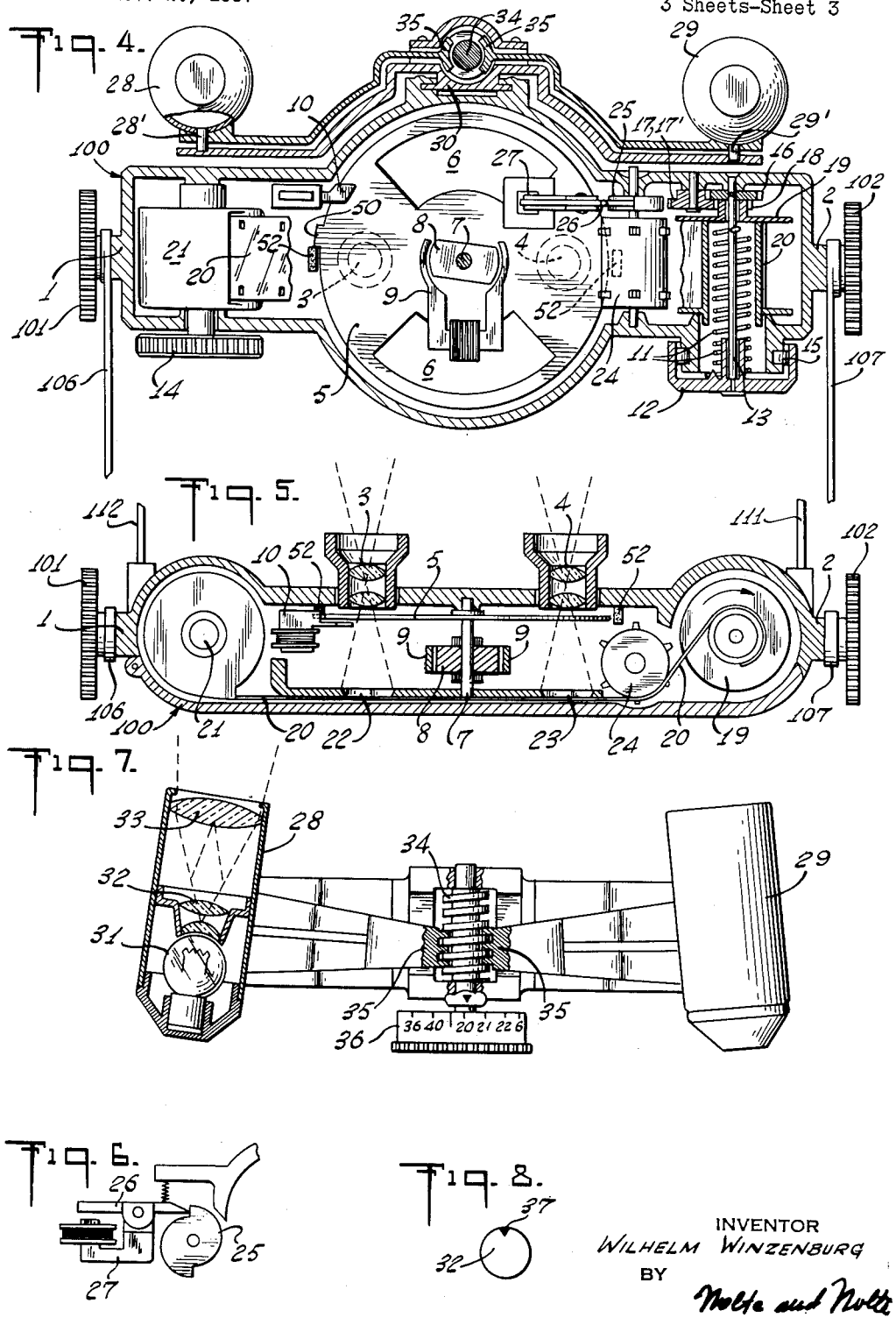
INVENTOR
WILHELM WINZENBURG
BY
Nolte and Nolte
ATTORNEYS United States Patent Office 2,990,765
Patented July 4, 1961

2,990,765
STEREO-CAMERA FOR SCIENTIFIC AND SURGICAL PHOTOGRAPHY
Wilhelm Winzenburg, Dresden, Germany, assignor to VEB Kamera- und Kinowerke Dresden
Filed Nov. 25, 1957, Ser. No. 698,581
Claims priority, application Germany Dec. 1, 1956
2 Claims. (Cl. 95—86)

The present invention relates to a small photographic camera and more particularly to a stereoscopic camera adaptable for surgical photography by being mounted on the forehead of the surgeon or his assistant for convenient and accurate use during the progress of a surgical operation.

The portrayal of surgery in the operating room during the actual operation can only be followed to a limited extent. For that reason, the potentialities of photography, stereo-photography, motion picture photography, and also television are being exploited for this purpose at the present time.

The primary shortcoming in the positioning of these prior device lies in the fact that an additional person must be present in the operating room, to be entrusted with the exposure apparatus in order to make the exposure over the shoulder of the surgeon or other person performing the operation. Hitherto, when a designated and important critical moment of the surgical operation was to be captured in the form of sequence pictures or as a television image, the surgeon was required to move to one side so that the objective of the camera could be placed at the spot where the surgeon's eyes had been, so as to record pictorially the area of the operation in its proper perspective and in favorable detail. As a consequence of such required side-movement, the surgeon is often greatly disturbed during the most difficult part of his work and must, in a given case, interrupt the continuity of the operation. Such interruption is, of course, not permissible, especially at the critical moments of a surgical operation. However, these critical moments are the very ones to be captured and recorded photographically for portrayal to students and also for later critical study by the surgeon himself.

The obtaining of such images or exposures with the previously applied methods and apparatus, and in collaboration with an additional person, can therefore be carried out only with difficulty, or not at all.

Accordingly, an object of the present invention is to provide a novel and improved camera which obviates the above-mentioned difficulties.

Another object of the invention is to provide means by which a surgeon can himself take accurate stereo photographs during even the most critical moments of a surgical operation without unduly disturbing the progress or continuity of his work.

Another purpose of the invention is to provide an especially light-weight camera which can be comfortably supported from the forehead of the person taking the pictures so that the objective lens or lenses of the camera will be located in close proximity to his eyes.

Still another object is to provide means facilitating the positioning of a camera into the line of vision of the person taking the picture.

A further object of the invention is to provide means affording a convenient and clear indication of the limits of a work area, which indication will define the picture image field of a camera and which can also serve for measurement of camera distance for focusing purposes.

A further object of the invention is to provide means for operating a camera automatically and electrically, so that all necessary on and off switching of the camera shutter, of the film movement, of picture image field indicators, and of other associated camera equipment can be controlled from a convenient switching device operable by hand or by foot.

Still another object of the present invention is to provide means conducive to automatic regulation of camera shutter time.

Other objects and many of the attendant advantages of this invention will be readily appreciated as the same becomes better understood by reference to the following detailed description when considered in connection with the accompanying drawings wherein:

FIG. 3 is an enlarged detailed side elevation view of the camera in the position of FIG. 1, with lighting apparatus and field-of-light indicator in working position;

FIGS. 4 and 5 show the stereo-camera in longitudinal cross-section across the width and thickness directions of the camera, respectively;

FIG. 6 is a detailed fragmentary view in section, showing the locking arrangement of the film movement sprocket, taken in a direction perpendicular to that of FIG. 4;

FIG. 7 is a plan view reversed in vertical direction with respect to FIGS. 2 and 3, partially in section, of the field-of-light projectors with their marked indicator dial;

FIG. 8 shows the condenser lens of the field-of-light projectors with an image-casting mark thereon; and FIG. 9 is a pictorial representation of the electrical control or switching apparatus.

Briefly, the present invention relates to an automatically-working and especially light-weight stereo-camera equipped with a head-band so as to be fastenable to the forehead of the person taking the pictures in such a manner that the objective lenses of the camera will be located as close as possible to his eyes, and therefore to his line of vision. The head-band is fastened in a suitably beneficial manner to a camera supporting appliance so as to make the camera adjustably rotatable about the transverse axis. For adjustment of the stereo-camera along the line of vision of the person taking the pictures, the invention provides for field-of-light projectors, attachable to the camera, to serve as a convenient and clear indication of the picture image field, projected as a circle or other pattern of light on the work area, and to serve for measurement of camera distance in a given case. In addition to the field-of-light projectors, there may be provided attachable and adjustable indicators of the boundary of the picture image in the form of thin, flexible stranded wires. A further feature of the invention lies in an operating shutter disc common to both objective lenses of the stereo-camera and adapted to be activated by means of the armature of a magnet which is arranged in a variable and reversible magnetic field. For regulation and adjustment of the shutter time, according to the invention, an electromagnetic brake is provided. A further feature of the invention lies in electromagnetically controlling the film movement. The invention further makes it possible to control all necessary on and off switching of the shutter, of the film movement, and of the field-of-light projectors from a convenient electrical switching device, operable either by hand or by foot.

Figure 1:
FIG. 1 is a side elevation view of a camera according to the invention, fastened by a headband to the head of a surgeon performing a medical operation.
Figure 2:
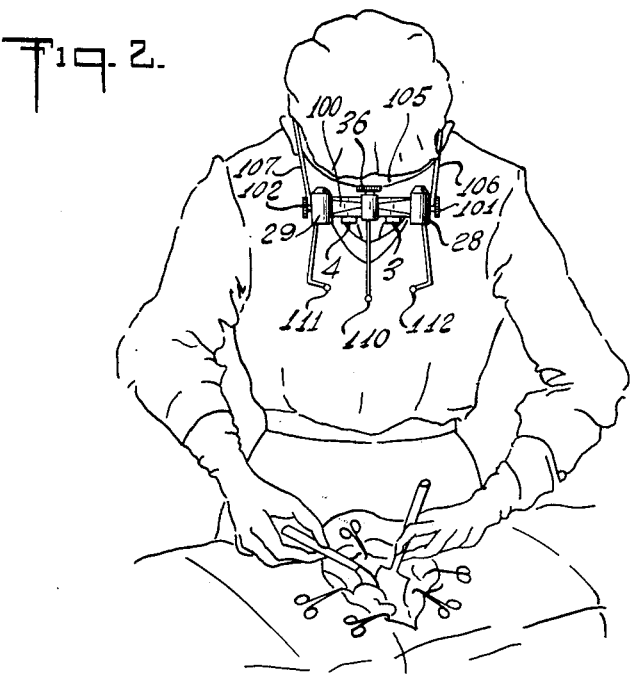
FIG. 2 is a front elevation view of the camera corresponding to FIG. 1.

Referring now to the drawings, wherein like reference characters designate like or corresponding parts throughout the several views, there is shown in FIGS. 1, 2 and 3 one embodiment of a stereo-camera according to the invention designated generally as 100, which numeral is also used to designate the camera housing. The stereo-camera 100 is pivotally fastened to a headband 105 which is provided with supporting arms 106 and 107.

For positioning the camera into the line of vision which the surgeon takes during the operation, field-of-light projectors 28, 29 are provided, attached to the camera 100, in a manner so as to indicate the image field of the camera (see FIG. 3) by projecting a beam of light from each projector onto the work area. With the help of these field-of-light projectors, the camera is placed into position in relation to the head and eyes of the surgeon shortly before the operation, with the help of an appropriate auxiliary object, if necessary, to direct the camera onto the zone where the operation is to take place. Simultaneous with the more distinct range of vision of the person performing the operation, the distance from his eyes or from the objective lens to the work area becomes determined, and the proper distance setting is then transmitted to the objective lenses 3, 4 of the camera 100 by hand or automatically. Investigations have shown that most surgeons always automatically maintain the same head position with a constant distance along a line of vision during an operation. Therefore, it would also be possible to operate the camera during the progress of the surgical operation without the use of the field-of-light projectors 28, 29.

Since, at the actual surgical operation, the work area of the operation is always brightly illuminated from other light sources, it is difficult to properly observe the circle or other field of light coming from the field-of-light projectors 28, 29. Therefore, according to the invention, additional picture boundary indicators 110, 111, 112 in the form of flexible stranded wires are attachably and adjustably arranged on the camera 100 (see FIGS. 2, 3 and 5) to train as well as to adjust the camera onto the zone of operation.

In order to maintain the camera light in weight, narrow black-and-white or color-film is used. By attaching the camera onto the head of the surgeon, a stable position of rest is provided, which permits an exposure time up to ⅕ of a second. This results in a great advantage in that the normal light of the customary operation lamp is sufficiently effective for such as exposure, even for color-film. A still further advantage obtained by supporting the camera on the head is that the stereo-picture taken by the surgeon himself during the operation will correspond to a correctly taken actual picture of what the surgeon himself sees. Such desired results come to practically complete fulfillment when the arrangement is made (not shown in the drawings) that the photographic objective lenses themselves are brought into play for projecting the fields of light. The source of light for the latter described construction may be provided as a lamp in the camera or may be reflected. Such an integral arrangement would then not require a separate adjustment, as does the arrangement of the auxiliary field-of-light projectors 28, 29.

In FIGS. 4 and 5 the most essential elements of a stereo-camera according to the invention are illustrated in sectional elevation and sectional plan view, respectively. On the camera housing 100 are located trunnions or supporting studs 1 and 2, upon which the camera 100 is pivoted about its transverse axis to head support 105, so that it can be clamped by means of screws 101 and 102 to the supporting arms 106 and 107 which are fastened to the head support 105 (see FIGS. 2 and 3). The objective lenses 3, 4 are adjusted by means of a range finder scale (not shown). The objective lenses may also, moreover, be coupled together, as is customary with stereo-cameras. Also, it is possible to then couple one of the objective lenses with the field-of-light projectors (coupling not shown in detail).

The closure means or shutter for the exposure time is different from the customary type of camera shutter. It comprises a rotary shutter disc 5 having cut-out portions 6. On the axial shaft 7 of the shutter disc 5 is fixedly mounted a small permanent magnet armature 8 which is rotatably arranged in a magnetic field generated by electromagnet 9. A reversal of polarity of the electromagnet 9 results in the shutter disc 5 being turned approximately 170°. The shutter disc 5 is limited in its extremity of rotational movement in each direction by a protruding boss or dog 50 acting in cooperation with one of two elastic or resilient limit stops 52, which may be of rubber, for example. For regulation of the rotational speed of the shutter disc 5, an electromagnetic eddy-current brake 10 is provided. A regulation of the shutter time for a small range of the exposure time setting is achieved by means of a change in the operating current intensity or amperage, causing a variation in field strength of the magnet 9.

The film movement is actuated after each exposure by a spring 11 located in the film wind-up spool 19. One end of spring 11 is fastened to the wind-up knob 12, and the other end is fastened to shaft 13 of the wind-up spool. Wind-up knob 12 is so placed in the camera housing 100 that it is rotatable only in the wind-up direction, i.e. clockwise, and is nonrotatable in the opposite direction. This is accomplished by means of a known type of free-wheeling roller 15, for example. The shaft 13 is freely rotatable in the wind-up knob 12 and also in the camera housing 100. For the purpose of maintaining a constant film span between the film sprocket 24 and film wind-up spool 19, a sprocket 16 is fastened to the free end of shaft 13. This sprocket 16 transmits its rotary motion through intermediate gears 17, 17' to the gear 18 of the film wind-up spool 19. The film 20, on which the stereo picture parts are taken in known manner, runs from supply spool 21 past two picture openings 22 and 23, over the sprocket 24 onto the film wind-up spool 19. The film wind-up spool 19 and the film 20 remain under tension by means of the wound-up spring 11 (see arrow in FIG. 5). The sprocket 24 is so proportioned in known fashion that one-half revolution of the sprocket 24 results in one complete advance of a film unit for the stereo picture. For the purpose of limiting the rotation of the sprocket 24, the latter is joined to a cam 25, which is held fast by means of a locking pawl or catch 26, operated by an electromagnet 27 (see FIG. 6).

The wiring of electromagnet 27 for actuating the film movement and the wiring of electromagnet 9 for actuating the shutter rotation are controlled from a separate electrical control or switching apparatus of junction box 51 (see FIG. 9). The necessary wiring connections for carrying through sequence pictures and automatically controlling the field-of-light projectors lead from this apparatus 51.

The constructional details of the individual wiring circuits of the control or switching apparatus 51 are not described in detail, since that subject matter does not form a part of the present invention. However, the apparatus 51 includes provisions for connections, for switches and for exposure time adjustment. The apparatus 51 is joined by a cable and plug 53 with a power source and is provided with plug-in contact connections or sockets 60, 70, 80. The contact socket 60 serves as an electrical connection to the stereo-camera 100. The current supplying wire from apparatus 51 to the stereo-camera follows cable 62 (as shown in FIG. 1). From coupling connection 64, separate circuits 66 and 68 branch off to serve for the lighting arrangement of both field-of-light projectors 28, 29 as well as to provide electrical supply for the electromagnetic control members 9, 10 and 27 (FIG. 4) situated in the stereo-camera 100.

The contact socket 70 provides a connection, through a cable 72, to a hand switch or contact 74. On the hand switch 74 are located two switching members or pushbuttons 76 and 78, which are provided for optional operation of individual pictures or of sequence pictures.

In a similar manner the contact socket 80 forms a connection, by means of cable 82, with a foot switch or contact 84. On the foot switch 84 are situated, in a manner similar to the hand switch 74, two switching members or push-buttons 86 and 88 which are also provided for optional operation of individual pictures or of sequence pictures, respectively. Operation of any of the mentioned switches or push-buttons 76, 78, 86 or 88, results in film movement for picture resetting and is performed by one of the assistants present after a stipulated sign on the part of the surgeon, or by the surgeon himself.

Further provided in the apparatus 51 is an electrical device for regulating the shutter speed or exposure time setting. The time adjustment knob 90 with its pointer 92 can be adjusted over a scale 94 from a long exposure or lighting time to a short one, for the requirements of a given case to which either a short or long exposure period is suited.

With reference to the film movement, there is provided according to the invention another embodiment wherein, instead of a spring operated wind-up, a multiple-poled, for example 8-poled, rotary magnet is arranged in connection with the wind-up spool for winding the film, the magnet poles thereof (not shown) likewise being automatically controlled from apparatus 51.

The rewinding of film 20 is carried out in the usual fashion; in order to save weight, an attachable or removable rewinding key 14 is provided. A locking device is located on the gears 17, 18 and is released in a known manner during the desired rewind. This locking device is not shown in the drawings, since such devices are known and are not the subject of the present invention.

In FIG. 7 the field-of-light projectors 28, 29 are shown, one of them in cross-section. The two projectors 28, 29 are joined together into a unitary assembly and are mounted onto the camera 100 by means of a T-shaped connecting piece 30 (FIG. 4). The filament coil of a small incandescent lamp 31 is so arranged that the light therefrom is projected through a condensing lens 32 into the vicinity of a projecting lens 33, so that an illuminated circle or other pattern of light will be projected from the condensing lens 32 onto the work area. Both field-of-light projectors 28, 29 are rotatable in relation to one another about their respective shafts 28' and 29' (FIG. 4), operable through a worm gear spindle 34 (FIG. 7) which meshes over its entire length with a helical worm thread provided in segments 35. The distance to the intersection of the optical axes of the field-of-light projectors can be read directly on dial 36. For adjustment of the lights to coincide into a single circle of light, the light rays from both field-of-light projectors 28, 29 are cast onto the zone of operation of the surgeon, and in an effective manner projected images of mark 37, for example a V-shape or notch (FIG. 8), originating from each condenser lens 32, are blended and focused together by movement of dial 36 (FIGS. 3, 7).

It should be realized, of course, that the inventive device is not to be restricted in any manner to only the photography of surgery or medicine. It is also contemplated that the device according to the invention can find numerous other uses for documentation purposes, such as, for example, in scientific research.

Obviously, many modifications and variations of the present invention are possible in the light of the above teachings. It is therefore to be understood that within the scope of the appended claims the invention may be practiced otherwise than as specifically described.

What is claimed is:

1. A camera assembly for photography of scientific work, surgical operations and the like, substantially within a work area along the line of vision of a person engaged in such work, comprising a camera having an objective lens mounted thereto, supporting means for securing said camera to the forehead of an operator and out of the line of vision of an operator when the operator's eyes are cast directly forward, and mechanical means adjustably secured to said camera and extending toward the work area, for defining the field limits of said camera for the eyes of the person, said mechanical means being adjustable along the line of sight of the person's eyes to coincide with the limits indicated by said lamps whereby parallax due to the mounting of said mechanical means is obviated, means for pivotally adjusting the axis of the objective lens of said camera along a plane transverse to the plane of the face of the operator, whereby said objective may be conveniently pointed downwardly toward the work area to be photographed, and a pair of lamps mounted on each side of said camera for movement therewith, said lamps being directed in the same direction as the direction of said objective axis, and means in said camera connected to said lamp for moving the axes of said lamps so that the field of illumination of each of said lamps will coincide upon the area to be photographed, and means connecting said means for moving said lamp to said camera to control the focus of said objective lens.

2. A setting arrangement on a camera for photographing individual moments of manual work accomplished by the operator of the camera, comprising supporting means for securing the camera from the head of a person in a position such that the objective lens of the camera will be situated in close proximity to the eyes and out of the line of vision of the operator, means for pivotally mounting the camera to said supporting means so that the camera will be adjustably rotatable about an axis transverse to the optical axis thereof, light projector means removably connected to the camera near the objective lens thereof for indicating picture area limits of the lens of said camera by casting patterns of light onto the work area, and a plurality of adjustable boundary-indicating wires secured to said camera and extending from said camera toward the work area for positioning along the line of vision of the operator so as to define the picture area limits of the camera; said wires being adjustable to define a limit area coinciding with the limit area indicated by said projector means, for the eyes of the operator whereby parallax introduced by the position of the camera with respect to the eyes is obviated.

References Cited in the file of this patent

UNITED STATES PATENTS

| 1,929,052 | Bowles | Oct. 3, 1933 |
| 2,166,419 | O'Neill | July 18, 1939 |
| 2,185,508 | Hunze | Jan. 2, 1940 |
| 2,239,379 | Bucky | Apr. 22, 1941 |
| 2,322,032 | Kunze | June 15, 1943 |
| 2,357,377 | Bausch | Sept. 5, 1944 |
| 2,428,627 | Kalman | Oct. 7, 1947 |
| 2,476,576 | Bachelder | July 19, 1949 |
| 2,541,555 | Sorkin | Feb. 13, 1951 |
| 2,581,300 | Rossman | Jan. 1, 1952 |
| 2,868,096 | Rothfjell | Jan. 13, 1959 |

FOREIGN PATENTS

| 167,405 | Austria | Jan. 10, 1951 |